(12) United States Patent
Yu et al.

(10) Patent No.: US 8,370,990 B2
(45) Date of Patent: Feb. 12, 2013

(54) STRUCTURAL IMPROVEMENT FOR ROBOTIC CLEANER

(75) Inventors: Jyh-Cheng Yu, Kaoshiung (TW); Shu-Jung Chang, Kaoshiung (TW)

(73) Assignee: National Kaohsiung First University of Science, Kaohsiung (TW)

( * ) Notice: Subject to any disclaimer, the term of this patent is extended or adjusted under 35 U.S.C. 154(b) by 387 days.

(21) Appl. No.: 12/884,160

(22) Filed: Sep. 16, 2010

(65) Prior Publication Data

US 2012/0066846 A1 Mar. 22, 2012

(51) Int. Cl.
*A47L 5/00* (2006.01)
(52) U.S. Cl. ............ 15/319; 15/339; 15/340.1; 180/8.2; 180/8.3
(58) Field of Classification Search ............ 15/319, 15/339, 340.1; 180/8.2, 8.3; *A47L 5/00*
See application file for complete search history.

(56) References Cited

U.S. PATENT DOCUMENTS

| 7,275,280 | B2* | 10/2007 | Haegermarck et al. | 15/340.1 |
|---|---|---|---|---|
| 8,061,461 | B2* | 11/2011 | Couture et al. | 180/9.32 |
| 2004/0143927 | A1* | 7/2004 | Haegermarck et al. | 15/319 |
| 2010/0125968 | A1* | 5/2010 | Ho | 15/319 |
| 2012/0090126 | A1* | 4/2012 | Kim et al. | 15/319 |

* cited by examiner

*Primary Examiner* — David Redding

(57) ABSTRACT

The present invention is an improved structure for robotic cleaner primarily comprising of a chassis with plurality of spherical casters fixed to the periphery of bottom deck, a dust collector mounted on the chassis, a lifting actuation mechanism mounted on the chassis that includes a lifting power supply at least to drive two parallel and extendable first swing arms and two parallel and extending second swing arms through a relevant linking device, a first gear train and a second gear train that can pivotally rotate in reverse direction, a drive wheel mounted at the moveable end of the two parallel and extending first swing arms each, a driven wheel mounted at the moveable end of the two parallel and extending second swing arms each, plural advancing power supplies mounted at the middle section of the first swing arms.

12 Claims, 11 Drawing Sheets

STRUCTURAL IMPROVEMENT FOR ROBOTIC CLEANER

BACKGROUND OF THE INVENTION

1. Field of the Invention

The present invention relates generally to an improved structure for robotic cleaner, and more particularly to a structure of cleaner that can climb a step obstacles or cross over a bump hindrance to negotiate different landforms and move to pre-designated location.

2. Description of the Prior Art

In the wake of the development of science & technology, the application for variety of automation devices have been stepwise bringing in from the machine tools of large and medium size for production in the past to the livelihood products of compactness and precision as an aid to promote the convenience of daily life; therein, the robotic cleaner (the so-called cleaning robot) that can move autonomously is their typical application to the regular household life.

A conventional robotic cleaner, in any case, mainly comprises of a chassis mounted a dust collector with a dust-wiping paper roller or a rotary brush fitted underneath where necessary; also, there will be plurality of moving elements (for example: wheel or caterpillar band) assembled to the periphery around the bottom deck of the chassis to be driven by one of the power devices (motor and transmission gear box) already mounted on the chassis to drive the chassis for movement that allows the dust-wiping paper or the brush to follow the moving path of the chassis to sweep the surface to be cleaned; in the meantime, the dust collector can collect the swept dusts and miscellaneous articles; nevertheless, although the foresaid robotic cleaner can be operable to perform the cleaning on a plane in a manner of autonomous movement, spiral movement, skirting around the wall or zig-zag movement, etc.; however, the operator shall give the cleaner a hand by pulling and lifting and helping the cleaner break away from a raised place (such as the sill or the step landforms with level difference) on the surface to be cleaned that fails the continuous movement of cleaner; thus doing not only results in an inconvenience against its use, but also restraints thereof occasion of application; the truly automatic performance is unachievable.

Therefore, the inventor of the present invention filed an Application No. 96100909 for a patent of "A robotic cleaner with climbing function" in this regard in Republic of China that discloses a structure that comprises of a chassis with a structure of dust collector mounted at the center of the chassis; wherein the dust collector is fitted a filter below its suction intake and the periphery of bottom deck around the chassis are fitted with plurality of downward-extending wheels while these wheels are fixed the spherical casters at their base; meanwhile, both opposite sides on the top of the chassis are erected two sets parallel and extending first swing arm and second swing arm respectively that allows the first arm and the second arm to pivotally rotate to stretch outward or retract inward to the chassis through a motor by driving the first gear for stretch and the second gears for retraction in conjunction with a belt to link with two linkages respectively; wherein, the external end of both the second swing arms are mounted a driven wheel that can be at idle rotation while both the first swing arms are mounted a drive wheel so that two motors mounted onto the chassis can transmit the power to these drive wheels respectively by passing through the plurality of advancing gear and a belt that enables the cleaner to retract the first and the second swing arms inside the chassis and allows the drive wheels to touch the ground (to match with each spherical casters) to be actuated for movement when used in a general plane status; when a climbing is desired, the cleaner can have the first and the second swing arms stretch outward and outside the chassis to support and lift the chassis for a certain height, and then actuate the drive wheels to move to overcome the need of moving on a landform of different height.

Even so, the aforesaid structure is to have the power supply (motor) of drive wheel mounted on the chassis and must transmit the power to the drive wheel at the external end of the first swing arm through the belt; therefore, in addition to the plural advancing gears connected to the output end of motor and two belt wheels assembled to the belt ends, the different status of separate rotation between the first swing arm and the belt (belt wheel) shall be overcome separately which makes thereof overall structure extremely complicated; it not only is inconvenient for assembly, but also is burdened the production cost; furthermore, its very difficult disassembly leaves a hard repair and maintenance operation; meanwhile, taking the advantage of belt connection for actuating the power may restrict thereof torque transmission where a higher transmission power is unbearable and a wear is prone to take place and affect the transmission efficiency after being used for a long time.

In the light of the abovementioned imperfection to the conventional robotic cleaner in possession of the climbing function, the inventor creates the present invention mainly focusing on the improvement against the foregoing imperfections.

SUMMARY OF THE INVENTION

The primary objective of the present invention is to provide a structural improvement for robotic cleaner that can effectively simplify the overall structure, enhance the convenience of assembly for production and disassembly for service.

Another objective of the present invention is to provide a structural improvement for robotic cleaner that has a better efficiency for power transmission and a longer lifespan of use.

The foregoing objectives and effectiveness of the present invention are attained by applying the technical approaches including:

a chassis with plurality of spherical casters fixed to the periphery of bottom deck that can be free to roll when exerted an external force, a dust collector mounted on the chassis that can move together with the chassis to collect the miscellaneous articles and dusts along the path of movement, a lifting actuation mechanism mounted on the chassis that includes a lifting power supply at least to output power through a linking device as a minimum, a first swing arm set comprised of two parallel and extending first swing arms at least with one end of the first swing arms jointed respectively to the linking device of the lifting actuation mechanism so that they can be actuated to rotate pivotally to perform the action of support and outward stretch or inward retraction, and with the other end of the first swing arm mounted a drive wheel each, a second swing arm set comprised of two parallel and extending second swing arms as a minimum with one end of the second swing arms can be jointed respectively to the linking device of the lifting actuation mechanism so that they can be actuated to rotate pivotally in a direction opposite to the first swing arm to perform the action of support and outward stretch or inward retraction, and with the other end of the second swing arms mounted a driven wheel each, plurality of advancing power supplies mounted at the middle section of the first swing arms each that can drive each drive wheel to rotate in forward and backward directions.

A complete understanding of the present invention with respect to the structural details, application of rationale, effect and performance can be had by reference to the following descriptions in conjunction with the accompanying figures wherein.

Figure 1:
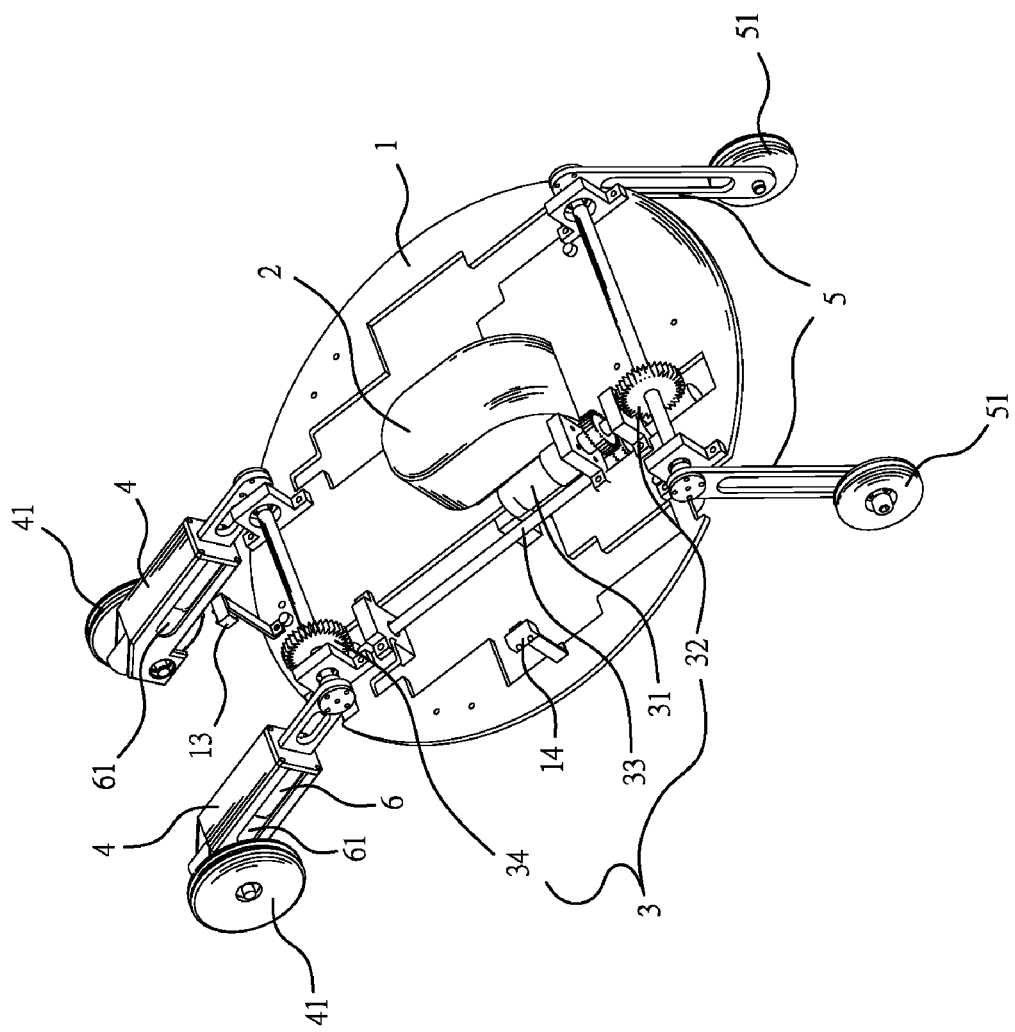
FIG. 1 is a schematic view of the structure in the first preferred embodiment for the present invention.
Figure 10:
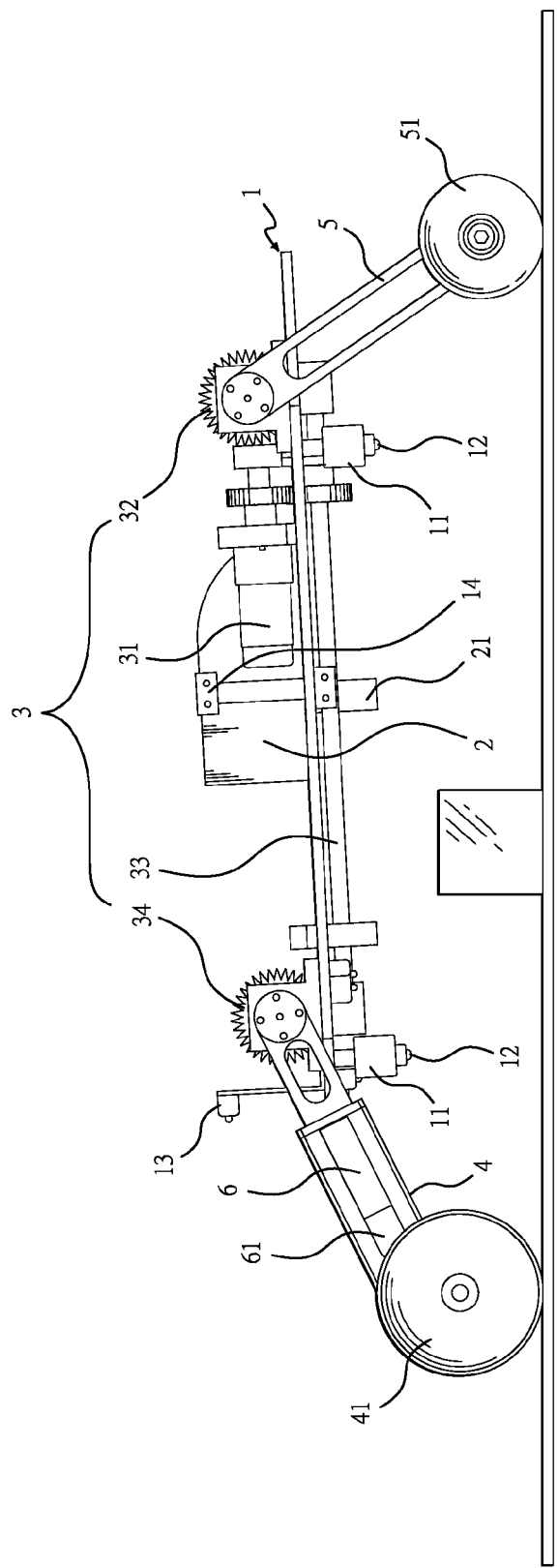
FIG. 10 is a planar motion view of the preferred embodiment for the present invention when crossing the bump obstacle.

DESCRIPTION OF THE REFERENCE NUMBERS FOR ELEMENTS IN THE FIGURES 1, 10 chassis
11 wheel holder
12 spherical caster
13 the first sensor
14 the second sensor
2 dust collector
21 filter
3, 30 lifting actuation mechanism
31, 35 lifting power supply
32 the first gear train
33 linkage
34 the second gear train
4 the first swing arm
41 drive wheel
5 the second swing arm
51 driven wheel
6 advancing power supply
61 speed reducer
7 step
8 sill

REPRESENTATIVE FIGURES DESIGNATED TO THE PRESENT INVENTION (I) The representative figure designated to the present invention is: the FIG. 1.

(II) Elements and thereof reference numbers used in the representative figure are as follows:

1 chassis
13 the first sensor
14 the second sensor
2 dust collector
3 lifting actuation mechanism
31 lifting power supply
32 the first gear train
33 linkage
34 the second gear train
4 the first swing arm
41 drive wheel
5 the second swing arm
51 driven wheel
6 advancing power supply
61 speed reducer

DETAILED DESCRIPTION OF THE PREFERRED EMBODIMENTS

Figure 9:
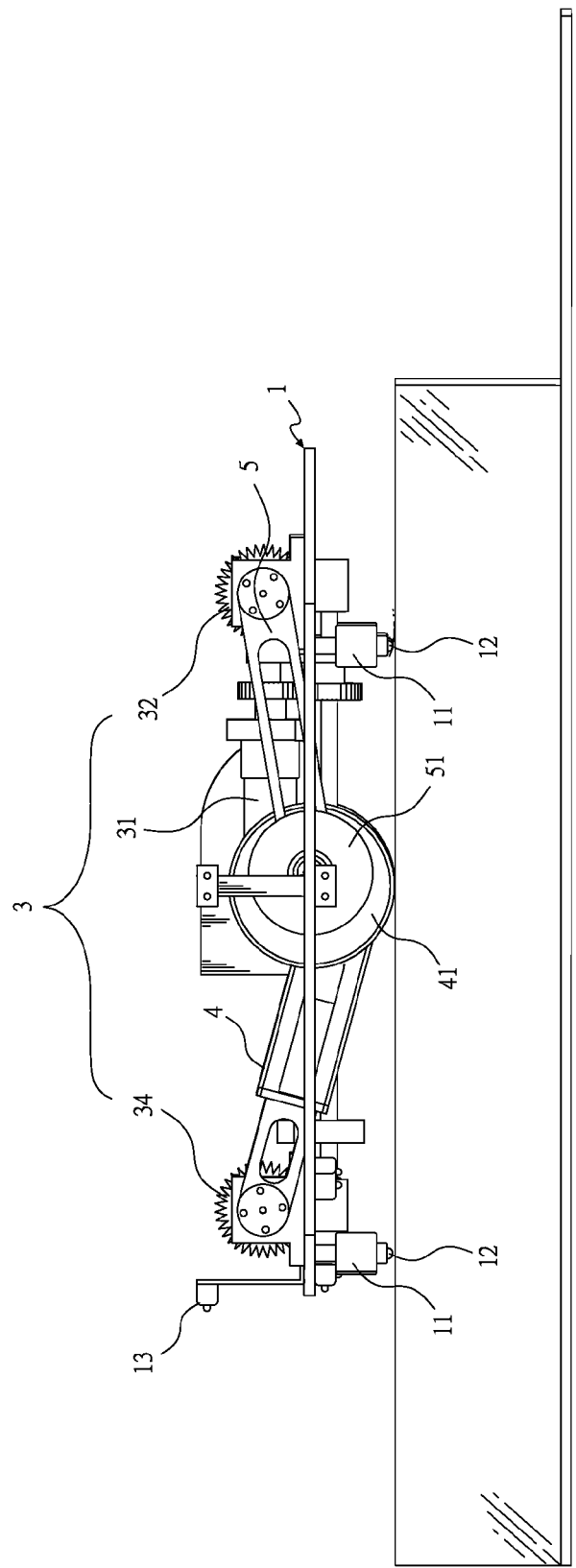
FIG. 9 is a planar motion view (3) of the preferred embodiment for the present invention when climbing a step obstacle.

Referring from the FIG. 1 to the FIG. 9, the structure of the first preferred embodiment for the present invention is outward shown to mainly consist of: chassis 1, dust collector 2, lifting actuation mechanism 3, the first swing arm 4, the second swing arm 5 and the advancing power supply 6, etc.; wherein, the chassis 1 can be formed as a flat plate roughly with plurality of down-extending wheel holder 11 fixed to the periphery of bottom deck while the bottom of each wheel holder 11 is fitted a spherical caster 12 that can be free to roll when exerted a force; the periphery around the chassis 1 are fitted the first sensor 13 and the second sensor 14 respectively at both sides; the dust collector 2 is seated on the chassis 1 with an air intake fitted below while the air intake is mounted a filter 21 so that the dust collector 2 can move together with the chassis 1 to collect the miscellaneous articles and dusts along the path of movement; the lifting actuation mechanism 3 including a lifting power supply 31 (can be a motor) and a linking device is assembled onto the chassis 1 while thereof linking device is comprised of the first gear train 32 and the second gear train 34 fitted to the periphery of the chassis 1 and the linkage 33 connecting the first gear train 32 and the second gear train 34 so that the gear train 32 and the gear train 34 can be driven by the lifting power supply 31 to rotate pivotally in backward direction respectively; at least two parallel and extending first swing arms 4 form the first swing arm set with one end (movable end) mounted a drive wheel 41 and the other end jointed to the output end of the second gear train 34 so that the first swing arm 4 can be driven by the second gear train 34 to rotate pivotally to perform the action of support and outward stretch or inward retraction; at least two parallel and extending second swing arms 5 form the second swing arm set with one end (movable end) mounted a driven wheel 51 and the other end jointed to the output end of the first gear train 32 so that the second swing arm 5 can be driven by the first gear train 32 to rotate pivotally to perform the action of support and outward stretch or inward retraction; the plurality of advancing power supplies 6 (can be a motor) are mounted at the middle section in each of the first swing arm 4 that can actuate each drive wheel 41 through the speed reducer 61 to rotate in forward and backward directions.

Figure 2:
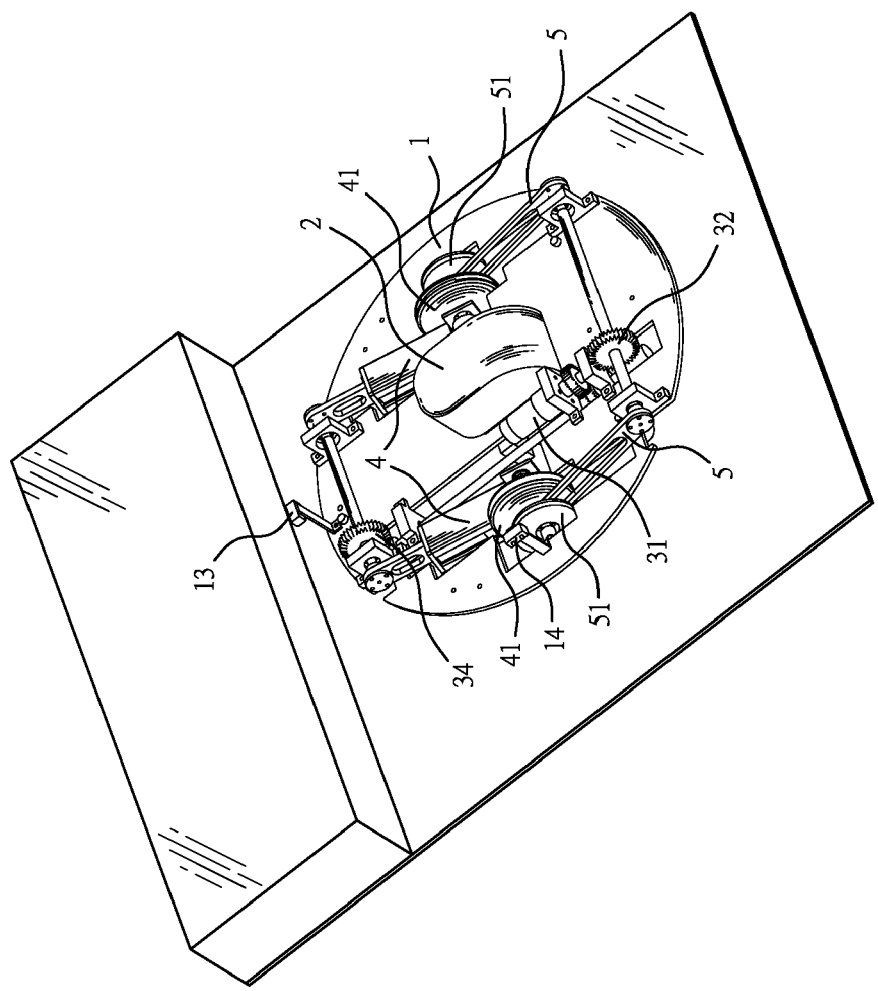
FIG. 2 is a three-dimensional view of the preferred embodiment at a general advancing status for the present invention.
Figure 3:
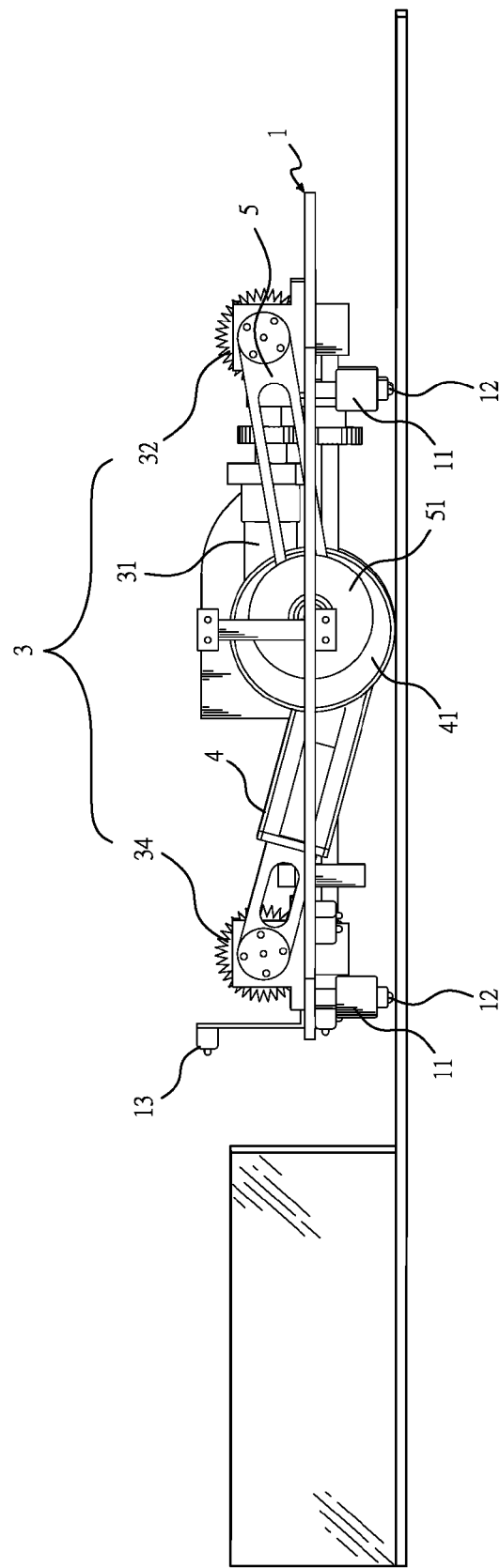
FIG. 3 is a planar view of the preferred embodiment at a general advancing status for the present invention.
Figure 4:
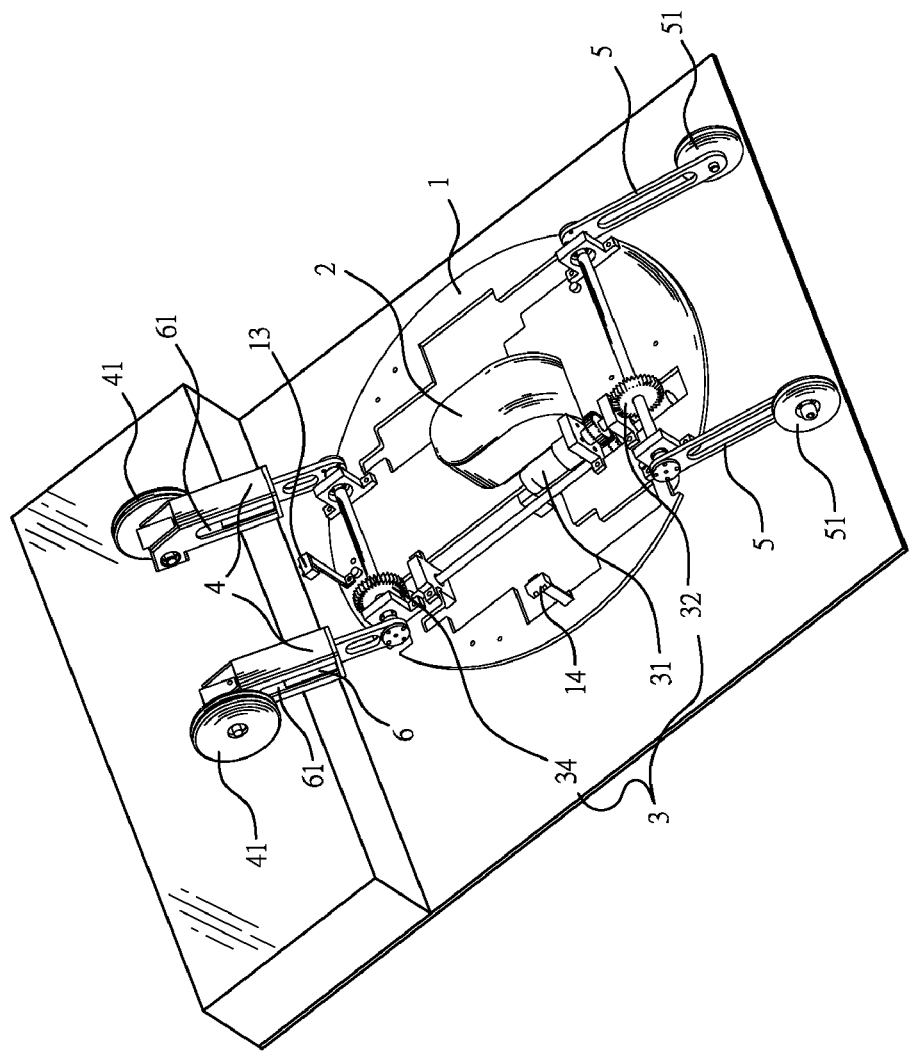
FIG. 4 is a three-dimensional motion view (1) of the preferred embodiment for the present invention when climbing a step obstacle.
Figure 5:
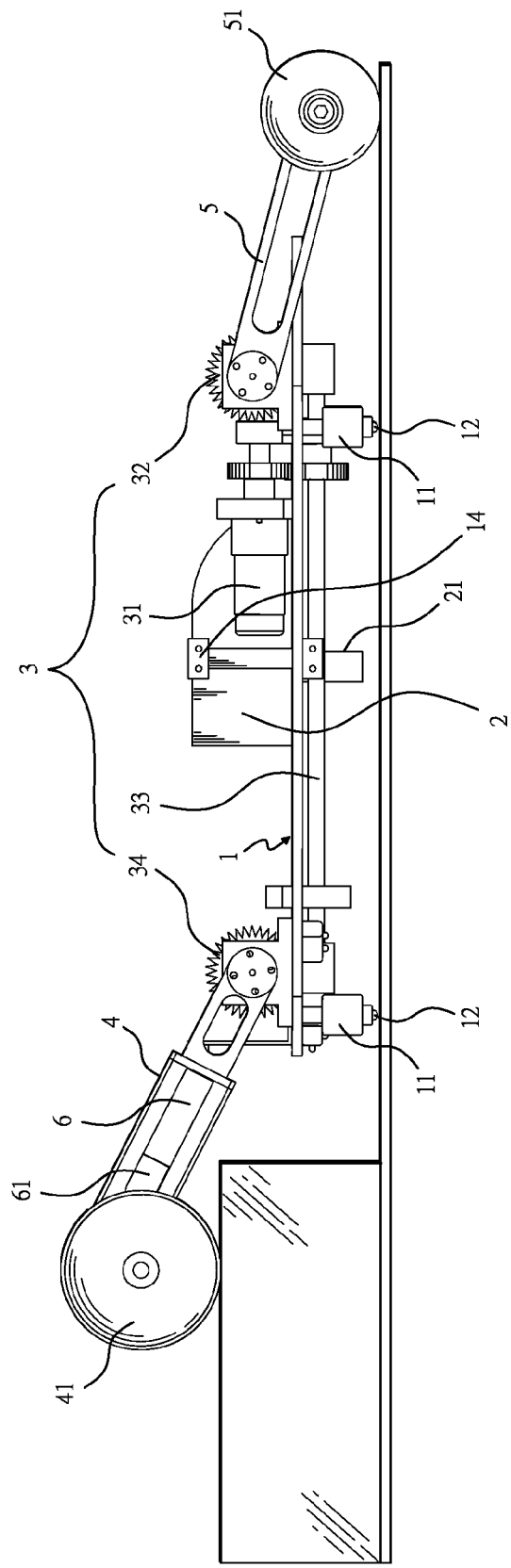
FIG. 5 is a planar motion view (1) of the preferred embodiment for the present invention when climbing a step obstacle.
Figure 6:
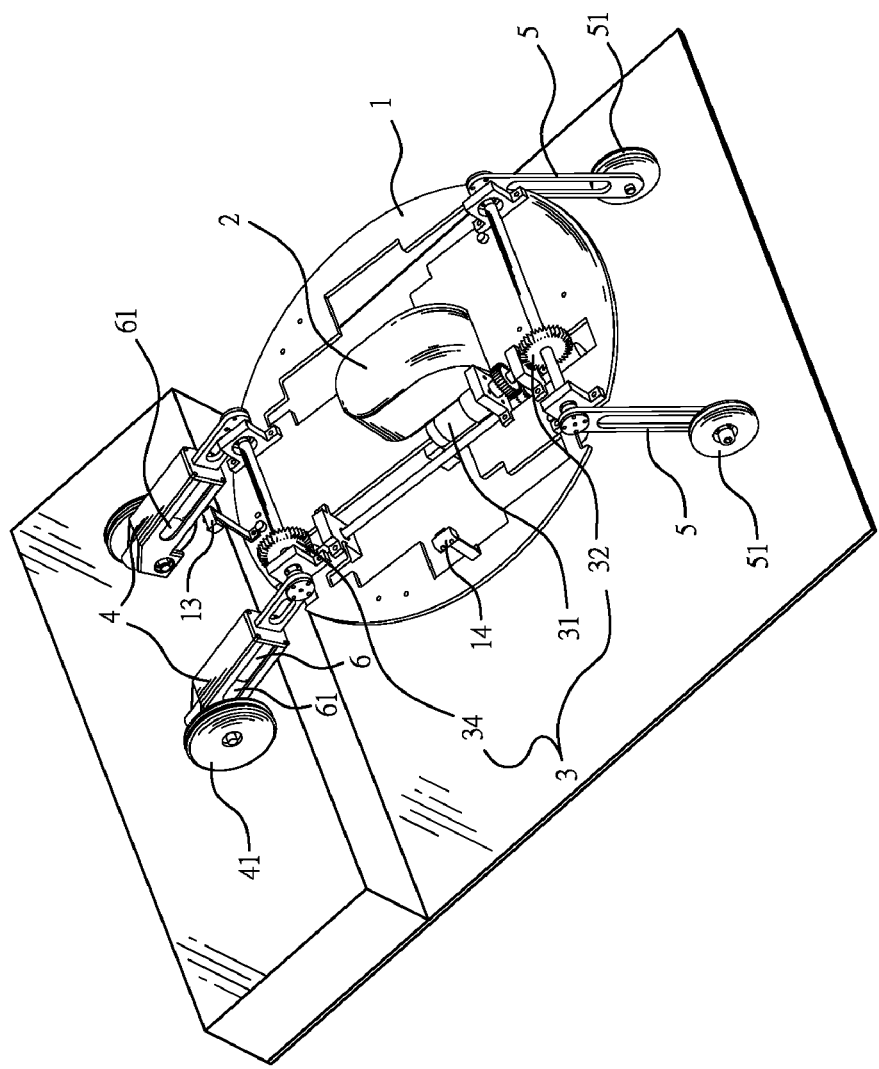
FIG. 6 is a three-dimensional motion view (2) of the preferred embodiment for the present invention when climbing a step obstacle.
Figure 7:
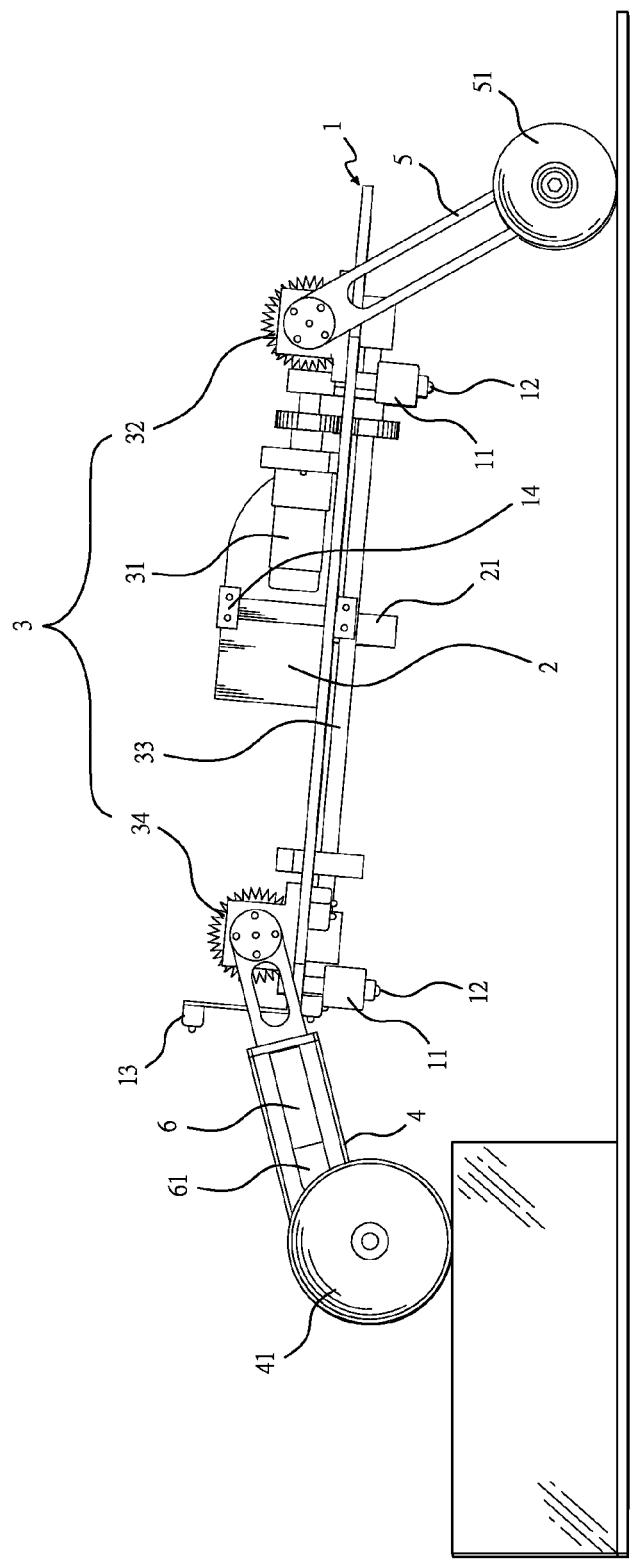
FIG. 7 is a planar motion view (2) of the preferred embodiment for the present invention when climbing a step obstacle.
Figure 8:
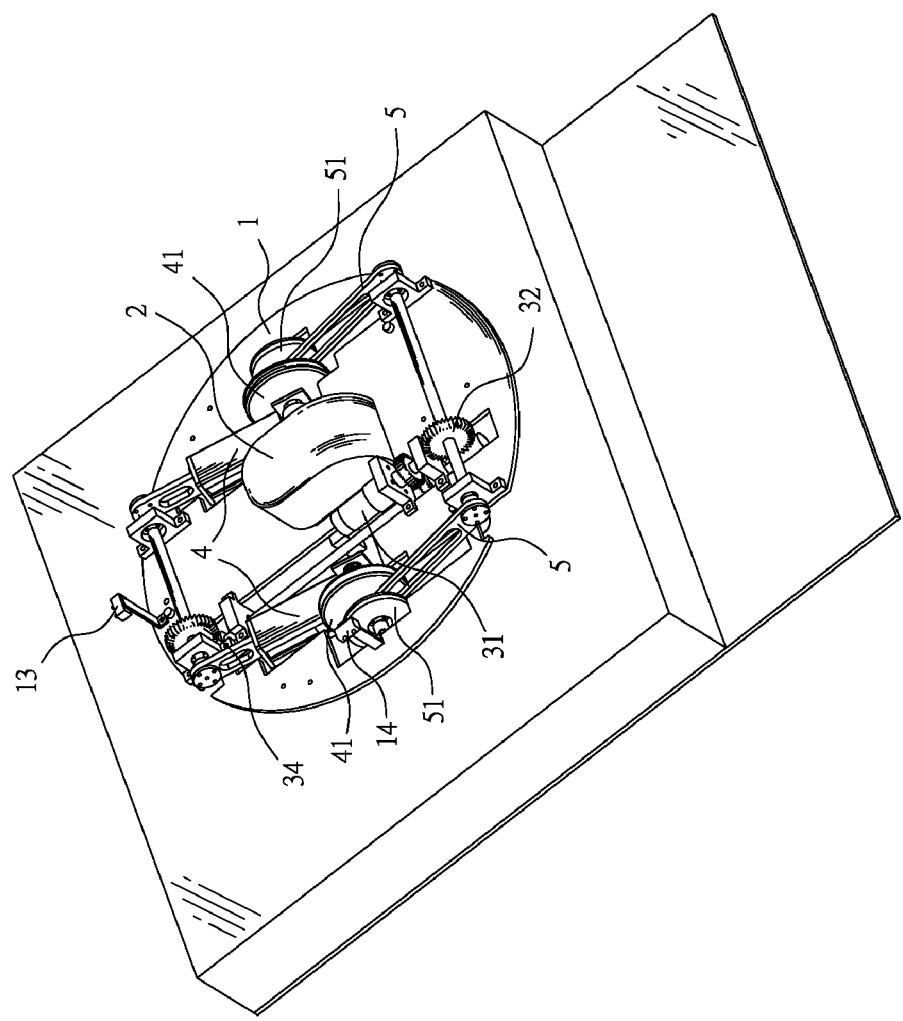
FIG. 8 is a three-dimensional motion view (3) of the preferred embodiment for the present invention when climbing a step obstacle.

When using the present invention on a general plane, the first swing arm 4 and the second swing arm 5 are retracted inside the chassis 1 while the drive wheel 41 is in touch with the ground, then each advancing power supply is energized to synchronously (or asynchronously) drive the drive wheel 1 in order to enable the chassis 1 to move linearly (or nonlinearly);

in the meantime, the dust collector 2 is able to move together with the chassis 1 to collect the miscellaneous articles and dusts along the path of movement (as shown in FIG. 2 and FIG. 3); meanwhile the sensor 13 and 14 are capable of detecting the characteristics of peripheral environment to the chassis 1; and when a raised bump portion (such as the step structure 7 shown in the FIG. 4 and FIG. 5) is detected by the sensor 13 and the sensor 14 in the way of movement, the chassis 1 will stop moving before reaching the step 7; at this moment, the first power supply 31 of the lifting actuation mechanism 3 will be activated to drive the first gear train 32 (simultaneously link to drive the second gear train 34 through linkage 33) to link for the first swing arms 4 and 5 to pivotally rotate and stretch outward so that the drive wheel 41 and the driven wheel 51 can support the chassis 1 on the ground from the external side to lift the chassis 1 over the height of the step 7; afterward the drive wheel 41 shall follow to drive the chassis 1 for moving to climb up the step 7 (as shown in FIG. 6 and FIG. 7); and next the first swing arm 4 and the second swing arm 5 will be retracted respectively in reversal direction to resume the generally movable pattern on the plane (as shown in FIG. 8 and FIG. 9).

Referring to the FIG. 10 for a locally raised (such as the sill 8 shown in the figure) portion on the ground, the first swing arm 4 (or the second swing arm 5) can pivotally rotate to stretch outward to cross the sill 8, and then follow the foregoing steps to lift the chassis 1 up and over the height of the sill 8 while the drive wheel 41 will drive the chassis 1 to cross over the sill 8; thus structure enables the present invention to effectively overcome the difference and obstacles given from the different landform and move to the desired position.

Figure 11:
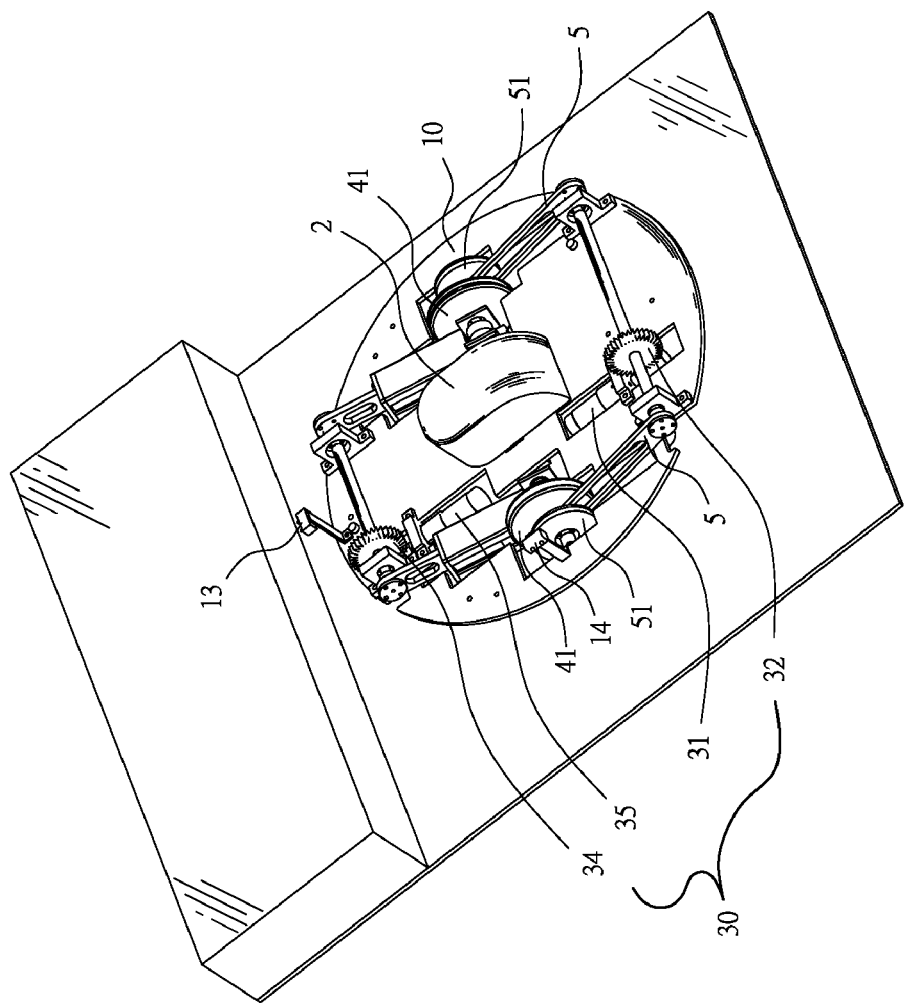
FIG. 11 is a schematic view of the structure in the second preferred embodiment for the present invention.

Referring to the FIG. 11, the structure in the second preferred embodiment of the present invention is shown that includes: chassis 10, dust collector 2, lifting actuation mechanism 30, the first swing arm 4, the second swing arm 5 and the advancing power supply 6, etc.; wherein, the lifting actuation mechanism 30 is erected two independent lifting power supplies 31 and 35 while these two lifting power supplies are connected to the first gear train 32 and the second gear train 34 respectively with the element 32 skipped; also the chassis 10 has a space enough to receive these two lifting power supplies 31 and 35 and the rest of the structural components are fully identical to the structural components in the first preferred embodiment aforementioned;

when operating the present invention, these two independent lifting power supplies 31 and 35, through the first gear trains 32 and 34 respectively, are able to drive the first swing arm 4 and the second swing arm 5 to rotate pivotally to stretch outward (support to lift the chassis 10) or retract inward (lower the chassis 10), the rest of actions with relation to each component are fully identical to the actions of the first preferred embodiment abovementioned; further description of details in this regard is not necessary.

Accordingly, the structural improvement for the robotic cleaner in the present invention is indeed in possession of the performance to climb a step obstacle or cross a bump hindrance to overcome and to be moveable on different landforms that truly let the present invention have the industrial availability, novelty and meliority.

It is of course to be understood that the preferred embodiments described above are merely the illustrative embodiments that is considered to represent one of the better embodiments for the present invention. It is therefore intended that the foregoing description illustrates rather than limits this invention; hence, all the changes and modifications made to the applied scope of claim for the present invention shall be resided in the scope of claim for the present invention.

What is claimed is:

1. An improved structure for robotic cleaner, that comprises at least:
    a chassis with plurality of spherical casters fixed to the periphery of bottom deck that can be free to roll when exerted an external force,
    a dust collector mounted on the chassis that can move together with the chassis to collect the miscellaneous articles and dusts along the path of movement,
    a lifting actuation mechanism mounted on the chassis that includes a lifting power supply at least to output power through a linking device as a minimum,
    a first swing arm set that comprises of two parallel and extending first swing arms as a minimum with one end of the first swing arm jointed respectively to the linking device of the lifting actuation mechanism and driven to rotate pivotally to perform the action of support and outward stretch or inward retraction and with the other end of the first swing arms are mounted a drive wheel each,
    a second swing arm set that comprises of two parallel and extending second swing arms as a minimum with one end of the first swing arm jointed respectively to the linking device of the lifting actuation mechanism and driven to rotate pivotally in a direction opposite to the first swing arm set to perform the action of support and outward stretch or inward retraction, and with the other end of the second swing arms are mounted a driven each,
    plural advancing power supplies mounted at the middle section of the first swing arms each that can drive each drive wheel to rotate in forward and backward.

2. An improved structure for robotic cleaner as claimed in the claim 1, wherein, the linking device of the lifting actuation mechanism is comprised of two gear trains, the first gear train and the second gear train, and a linkage connecting the first gear train and the second gear train; also the first gear train is assembled to the first swing arm set while the second gear train is assembled to the second swing arm set so that the first gear train can be actuated by the lifting power supply to link through the linkage to drive the second gear train for the first swing arm set and the second swing arm set to pivotally rotate in reverse direction respectively.

3. An improved structure for robotic cleaner as claimed in the claim 1, wherein, the linking device of the lifting actuation mechanism is comprised of two gear trains, the first gear train is coupled to the lifting power supply while the second gear train is coupled to another lifting power supply, that allows these two lifting power supplies to drive the first swing arm set and the second swing set directly and respectively to pivotally rotate in reverse direction.

4. An improved structure for robotic cleaner as claimed in the claim 1, wherein, a plurality of sensors are fixed to the peripheral edge around the chassis that can detect the characteristics of peripheral environment;
    a speed reducer is mounted between the advancing power supply and the drive wheel; an air suction intake is fitted to the dust collector while the air intake is mounted a filter.

5. An improved structure for robotic cleaner as claimed in the claim 2, wherein, a plurality of sensors are fixed to the peripheral edge around the chassis that can detect the characteristics of peripheral environment;
    a speed reducer is mounted between the advancing power supply and the drive wheel; an air suction intake is fitted to the dust collector while the air intake is mounted a filter.

6. An improved structure for robotic cleaner as claimed in the claim 3, wherein, a plurality of sensors are fixed to the peripheral edge around the chassis that can detect the characteristics of peripheral environment;
  a speed reducer is mounted between the advancing power supply and the drive wheel; an air suction intake is fitted to the dust collector while the air intake is mounted a filter.

7. An improved structure for robotic cleaner as claimed in the claim 1, wherein, a speed reducer is mounted between the advancing power supply and the drive wheel; an air suction intake is fitted to the dust collector while the air intake is mounted a filter.

8. An improved structure for robotic cleaner as claimed in the claim 2, wherein, a speed reducer is mounted between the advancing power supply and the drive wheel; an air suction intake is fitted to the dust collector while the air intake is mounted a filter.

9. An improved structure for robotic cleaner as claimed in the claim 3, wherein, a speed reducer is mounted between the advancing power supply and the drive wheel; an air suction intake is fitted to the dust collector while the air intake is mounted a filter.

10. An improved structure for robotic cleaner as claimed in the claim 1, wherein, an air suction intake is fitted to the dust collector while the air intake is mounted a filter.

11. An improved structure for robotic cleaner as claimed in the claim 2, wherein, an air suction intake is fitted to the dust collector while the air intake is mounted a filter.

12. An improved structure for robotic cleaner as claimed in the claim 3, wherein, an air suction intake is fitted to the dust collector while the air intake is mounted a filter.

* * * * *